(12) United States Patent
Wimbock

(10) Patent No.: US 11,418,944 B2
(45) Date of Patent: Aug. 16, 2022

(54) ADAPTIVE ESIM DELIVERY

(71) Applicant: GIESECKE+DEVRIENT MOBILE SECURITY GMBH, Munich (DE)

(72) Inventor: Ulrich Wimbock, Los Gatos, CA (US)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 138 days.

(21) Appl. No.: 16/956,991

(22) PCT Filed: Dec. 20, 2018

(86) PCT No.: PCT/EP2018/000577
§ 371 (c)(1),
(2) Date: Jun. 22, 2020

(87) PCT Pub. No.: WO2019/120609
PCT Pub. Date: Jun. 27, 2019

(65) Prior Publication Data
US 2021/0368329 A1 Nov. 25, 2021

(30) Foreign Application Priority Data
Dec. 22, 2017 (DE) .......................... 102017011962.7

(51) Int. Cl.
*H04M 3/00* (2006.01)
*H04W 8/20* (2009.01)
*H04W 8/18* (2009.01)

(52) U.S. Cl.
CPC ........... *H04W 8/205* (2013.01); *H04W 8/183* (2013.01)

(58) Field of Classification Search
None
See application file for complete search history.

(56) References Cited

U.S. PATENT DOCUMENTS 9,998,896 B1 * 6/2018 Guven .................... H04L 61/20
10,516,988 B2 12/2019 Fan et al.
(Continued)

FOREIGN PATENT DOCUMENTS

WO 2016010387 A1 1/2016
WO 2017041306 A1 3/2017

OTHER PUBLICATIONS

"eUICC Profile Package: Interoperable Format Technical Specification," SIMalliance, Version 1.0, Jun. 25, 2015, 65 Pages.
(Continued)

*Primary Examiner* — Jinsong Hu
*Assistant Examiner* — Alexander J Yi
(74) *Attorney, Agent, or Firm* — Workman Nydegger

(57) ABSTRACT

A method of adaptive generation of a profile package is constructed to install a profile in the eUICC. The method includes adaptive generation of a code package constructed to install an executable code in the device. A batch of multiple profile (or code) descriptions is provided. The target eUICC/target device or some other competent instance is arranged to provide the transfer server with configuration information of the target eUICC/target device. The transfer server retrieves, instead of a ready-made profile (code) package (eSIM), only a profile (code) description and profile (code) data. The transfer server then generates the profile package adaptively, there-in flexibly considering the configuration information on the target eUICC/target device. By this adaptive way of profile generation, profile packages matching with the real target eUICC/target device are generated. Such a matching profile package can be successfully installed in the eUICC.

10 Claims, 3 Drawing Sheets eSIM Preparation as per Invention

(56) References Cited

U.S. PATENT DOCUMENTS

| | | | | |
|---|---|---|---|---|
| 2009/0221278 A1* | 9/2009 | Spelta | ................... | H04W 8/205 |
| | | | | 455/418 |
| 2012/0329522 A1* | 12/2012 | Jacobs | ................. | H04W 8/183 |
| | | | | 455/558 |
| 2013/0315072 A1* | 11/2013 | Hietalahti | ............ | H04W 48/16 |
| | | | | 370/242 |
| 2015/0303966 A1* | 10/2015 | Lee | ...................... | H04L 67/306 |
| | | | | 455/466 |
| 2015/0350881 A1 | 12/2015 | Weiss et al. | | |
| 2017/0077975 A1* | 3/2017 | Wang | .................... | H04W 8/183 |
| 2017/0142121 A1* | 5/2017 | Lee | ...................... | H04W 12/06 |
| 2018/0255451 A1 | 9/2018 | Fan et al. | | |
| 2019/0037335 A1* | 1/2019 | Steck | ................... | H04W 8/186 |

OTHER PUBLICATIONS

"Remote Provisioning Architecture for Embedded UICC Technical Specification," GSM Association, Version 3.2, Jun. 27, 2017, 309 Pages.
"RSP Technical Specification," GSM Association, Version 2.2, Sep. 1, 2017, 264 Pages.
German Search Report from corresponding DE Application No. 102017011962.7, dated Aug. 3, 2018.
International Search Report and Written Opinion from PCT Application No. PCT/EP2018/000577, dated Apr. 16, 2019.

* cited by examiner eSIM Preparation Today eSIM Preparation as per Invention

ADAPTIVE ESIM DELIVERY

FIELD OF THE INVENTION

The present invention relates to generation of profile packages intended to be downloaded to eUICCs, so as to implement, in the eUICC, a mobile network subscription profile, or briefly a profile.

BACKGROUND OF THE INVENTION

The document [1] [SGP.02_v3.2] GSMA *"Remote Provisioning Architecture for Embedded UICC, Technical Specification"*, Version 3.2, 27 Jun. 2017" describes the processes of profile download and installation to an eUICC (embedded UICC), so as to install a profile in the eUICC. According to [1], chapter 3.1.3, page 45, "Download and installation of the profile", FIG. 13, and text below ("Procedure") a profile package (called "profile data" in document [1]) is downloaded into a eUICC and installed there, so as to install a profile in the eUICC.

Document [2] [SGP.22] GSMA *"RSP Technical Specification*, Version 2.2, 1 Sep. 2017" describes properties of profile packages used for downloading and installing profiles to eUICCs (chapter 2.5), as well as procedures used for remote provisioning of eUICCs by downloading and installing profile packages from a server, such as a data preparation server SM-DP+, to an eUICC, so as to implement in the eUICC profiles. Document [2] uses the term of profile packages which will be used throughout this application as well.

A profile package is generated by processing of a profile description together with profile data (profile data in a narrower sense). The profile description implies data specific to the use case of the profile, for example kind of subscription, mobile network operator, country, and the like. The profile data (in a narrower sense) imply individual data specific to a particular profile or user, such as International Mobile Subscriber Identity IMSI, authentication key Ki, mobile phone number MSISDN, or the like. Particularly, all security relevant individual assets like IMSI and Ki (also any other individual asses like OPc, OTA keys, ICCID, . . . ) are contained in the profile data, and are not contained in any profile description.

Currently profile packages are prepared at a time of data generation, which is prior to a time of profile download and installation, in batch mode. Multiple profile packages are generated at a data preparation server and stored there. During profile package generation, the data preparation server has no knowledge on which type of mobile device and which type of eUICC will later on receive the generated profile package, and even less which particular mobile device and which particular eUICC will later on receive the generated profile package.

Throughout this present application, the term "profile package" will be used to designate the entity of data ready for download to an eUICC, corresponding to "profile data" of [1] and "profile package" of [2]. The term "profile data" will be used to designate data specific to a particular profile or user, such as IMSI, Ki, MSISDN, or the like.

For the data preparation server, several architecture types are known.

According to document [1] [SGP.02_v3.2], a data preparation server comprises a Subscription Manager Data Preparation SM-DP (data preparation in the narrower sense) performing tasks of data generation such as profile package generation, and a therefrom separated Subscription Manager Secure Router SM-SR performing tasks of downloading generated profile packages to a transfer server AirOn and therefrom to an eUICCs (see for example chapter 2.1 "General Architecture", FIG. 1: eUICC Remote Provisioning System).

According to document [2][SGP.22] *GSMA "RSP Technical Specification*, Version 2.2, 1 Sep. 2017", a data preparation server comprises a single combined enhanced Subscription Manager Data Preparation SM-DP+ performing both tasks of data generation such as profile package generation, and tasks of downloading generated profile packages to the transfer server AirOn and therefrom to eUICCs.

At a time of profile download and installation, which is some generally arbitrary point in time later than the time of profile package generation, some target eUICC is selected, the target eUICC requests at the transfer server AirOn download of a profile package, and a ready-made profile package is downloaded from the data preparation server to the transfer server, and from the transfer server (AirOn server) to the target eUICC. Before profile package download, session keys for the profile to be downloaded are established on the target eUICC, the profile is encrypted with the session keys, downloaded, decrypted in the eUICC, and implemented/installed in the eUICC.

The problem with the above described approach of pre-generated profile packages is that the process of profile package generation makes use of eUICC features, so as to establish a package configuration suitable for a particular target eUICC having those features. Typically, the target eUICC and its features are unknown to the data preparation server at the time of data preparation. Therefore, a generated profile package can have a configuration that is not suited for some target eUICCs. If a profile package is downloaded to a target eUICC with the profile having an configuration unsuitable for the target eUICC, the subsequent package installation in the eUICC following up to the download will fail. This lowers the success rate of profile installations to different device targets.

Another issue of preparing profile packages at time of data preparation or manufacturing is that the configuration of the prepared profile packages is set and cannot be changed any more. Profiles generated and available in the platform are thus static. In case an MNO makes amendments to the eUICC (e.g by launch of additional applications inside the eUICC, or by change of phonebook format inside the eUICC, or the like), the amendments result in an amended configuration of the eUICC. Correspondingly, new profile packages having this particular amended configuration have to be prepared. All already existing profile packages remain as they have been produced. Later amendments to package profiles are not possible, or uppermost via a highly complex rework process.

Documents [1] [SGP.02_v3.2] and [2] [SGP.22] relate to two different remote provisioning technologies, each requiring profile data to be provided in different formats and result in generated profile packages having different formats. One further disadvantage of present data preparation is thus that profile data and generated profile packages are tied to a specific remote provisioning management technology. Profile packages generated under [1] [SGP.02_v3.2] are not applicable in remote provisioning under [2] [SGP.22], and vice versa.

Summarizing, when a target eUICC requests to the transfer server download of a profile package, traditionally, the transfer server retrieves a ready-made profile package (eSIM) from the transfer server and downloads in to the target eUICC via the target device hosting the target eUICC.

In case the profile package doesn't match with the target eUICC and/or with the target device, the downloaded package cannot be installed in the target eUICC. Consequently, the profile installation fails.

Similarly, a wish for higher flexibility can arise upon loading and installation of executable code other than subscription profiles, for example upon loading and installation of operating systems into a device, or of an image of an operating system into a device, with the aim to install, in the device, an operating system or other executable code.

Objective of the Invention

It is an object of the present invention to provide a method for the generation of profile packages which is more flexible than and has a higher success rate as compared to presently used solutions. In is a further object of the invention to provide a corresponding method for the generation of code packages for other executable code that profiles, for example operating systems.

SUMMARY OF THE INVENTION

In greater detail, the object of the invention is achieved by a method with the following features, according to claim 1 and claim 2, respectively. Embodiments of the invention are presented in dependent claims.

The invention according to claim 1 provides a method of adaptive generation a profile package, said profile package being constructed to, when being downloaded to an eUICC and installed in the eUICC, install a profile in the eUICC. The method comprises the steps: (1) provide a profile description;
(2) at a data preparation server (e.g. a SM-DP+ or a SM-DP), provide profile data (comprising for example at least IMSI, Ki, . . . ); (3) provide the profile description with the profile data and execute the profile description together with the profile data to generate a profile package.

According to the invention as claimed in claim 1, a batch of multiple profile descriptions is provided, instead of providing a batch of ready-made profile packages. When a target eUICC/target device requests to the transfer server download of a profile package, the target eUICC/target device or some other competent instance provides the transfer server with configuration information of the target eUICC/target device. The transfer server retrieves, instead of a ready-made profile package (eSIM), only a profile description and profile data. Therein, the profile description is selected considering the configuration information provided by an instance providing of said configuration information. The transfer server then, via execution of the profile description together with the profile data, generates the profile package adaptively, therein flexibly considering the configuration information on the target eUICC/target device. By this adaptive way of profile generation, profile packages matching with the real target eUICC/target device are generated. Such a matching profile package can be successfully installed in the eUICC.

Thus the success rate in profile package download and installation is enhanced, due to adaptive and flexible consideration of characteristics of the target eUICC and/or target device.

The instance providing the configuration information to the transfer server, for the purpose of enabling selection of a suited profile description, can according to a first group of embodiments be the target eUICC/target device, for example in eUICCs compliant with specification [2][SGP.22] ("RSP"). Alternatively, according to a second group of embodiments, which is for example fulfilled in M2M provisioning use cases, the instance providing the configuration information to the transfer server can be the data preparation server, which retrieves the configuration information from the EIS (EIS=eUICC Information Set) data stored at the data preparation server. In the second embodiments, the configuration information can for example imply the eUICC Identifier EID. In typical M2M use cases, the EID is pre-stored in the EIS of the data preparation server and is thus already known to the data preparation server at the time of provisioning.

The inventive concept is applicable to profile package generation starting from a profile description and profile data, as described above. The inventive concept is further applicable to code package generation starting from a code description and code data, as described below.

Thus, the invention according to claim 2 provides a method of adaptive generation of a code package, said code package being constructed to, when being downloaded to a device and installed in the device, install an executable code in the device. The method comprising the steps: (1) provide a code description; (2) at a data preparation server, provide code data; (3) provide the code description with the code data and execute the code description together with the code data to generate a code package. The inventive concept is to provide several code descriptions and adaptively select one and fill it with code data, similar to the process described above for a profile package. The executable code can for example be an operating system.

In step (1.2), several sources or instances for providing the transfer server with the configuration information are possible. For example, the transfer server can receive all or some configuration information directly from the target eUICC or from the target device or, as applicable, only from the device. Also, the transfer server can receive all or some configuration information from a data preparation server, such as SM-DP+ or SM-DP or SM-SR, particularly an internal record of such a data preparation server.

Also, configuration information provided by the eUICC/device directly and configuration information provided by a data preparation server can complete each other.

Particularly, in M2M use cases, configuration information can be provided to the transfer server (AirOn) before and independently of a profile or code download to a particular M2M device or M2M eUICC. The merger of profile/code description and profile/code data and execution of the merged description and data, so as to generate the profile or code package, is done only upon profile/code download, in reaction to and after the transfer server having received, from an eUICC/device a request for profile/code download.

According to embodiments of the invention, the configuration information received in step (1.2) consists of a particular parameter set comprising one or several parameters.

According to some embodiments, the above mentioned parameters of the parameter set are identified as either mandatory or optional parameters. Therein, the parameter set comprises at least mandatory parameters, and optionally in addition also optional parameters. Further on, the profile description is retrieved based on the mandatory parameters. In case optional parameters are contained in the parameter set, the retrieved profile description is adapted based on the optional parameters. For example, in a mobile network subscription profile, EID and IMEI and ICCID are preferably mandatory parameters.

The parameter set can in particular comprise one or several of the following parameters: parameters characteristic of the target eUICC; parameters characteristic of the target device. More specifically, the parameters can comprise one or several of the following: one or several parameters indicating eUICC capabilities of the target eUICC; one or several parameters indicating device capabilities of the target device; one or several eUICC certificates of the target eUICC; an eUICC identifier (EID) of the target eUICC; an Integrated Circuit Card Identifier (ICCID) or comparable unique electronic serial number of the target eUICC; an International Mobile Station Equipment Identity (IMEI) of the target device.

The configuration information of step (2) can for example comprise configuration information on the target eUICC and/or configuration information on the target device.

According to some embodiments, in step (1.1), the multiple different profile descriptions or code descriptions, respectively, are provided with placeholders for later insertion of profile data or code data, respectively. Later, in step (3), the retrieved profile description or code description is provided with the profile data or code data for the target eUICC in that the placeholders are replaced by the profile data or code data.

The method according to the invention can further comprise an additional binding step, in which, (4) at the transfer server (AirOn), a binding of the generated profile package or code package to the target eUICC by means of a secret, particularly a session key, is established between the eUICC and the transfer server.

According to some embodiments, in step (2), the profile data or code data are prepared considering input from a MNO server of a Mobile Network Operator MNO, and in step (1.1), the multiple different profile descriptions or code descriptions are received from the MNO server of a Mobile Network Operator MNO.

In some embodiments, in step (2), additional profile data are provided which are not considered in step (3) to execute the retrieved matching profile description together with the profile data, such that the profile package is generated without the additional profile data.

In some embodiments, step (3), to generate the profile package, is executed only in reaction to a request from the eUICC to the transfer server to download a profile package or code package, respectively, to the eUICC. By this, the providing of the several profile descriptions to the transfer server can be done in advance to and independently of a request for profile/code download. Also some configuration can be provided to the transfer server can be done in advance to and independently of a request for profile/code download. However the merger of profile (or code) description with profile (or code) data and subsequent execution, so as to generate the profile (or code) package is done only upon request of a profile (or code) download received at the transfer server from a target eUICC or target device, or possibly from some other instance.

BRIEF DESCRIPTION OF THE DRAWINGS

Embodiments of the invention will now be described with reference to the accompanying drawings, throughout which like parts are referred to by like references, and in which represent.

DETAILED DESCRIPTION OF THE INVENTION

Figure 1A:
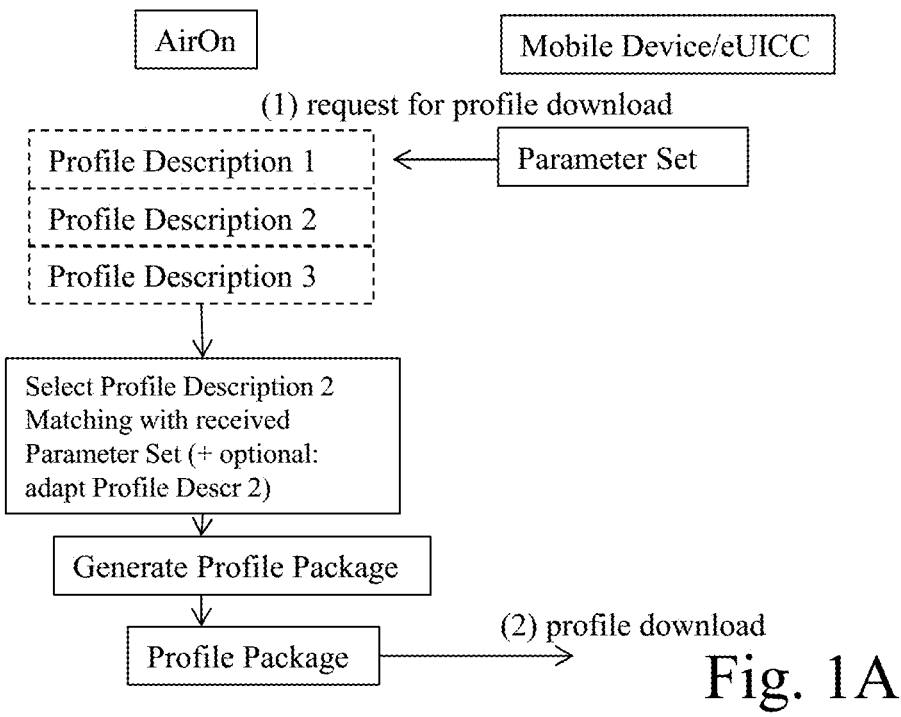
FIG. 1A: a schematic diagram showing adaptive generation of a profile package, according to embodiments of the invention.

FIG. 1A shows a coarse schematic diagram showing adaptive generation of a profile package, according to embodiments of the invention. On the occasion of an intended profile download to a target eUICC, the target eUICC, via a target device hosting the target eUICC, (1) sends a request for profile download to a transfer server AirOn, together with a parameter set characteristic of the target eUICC and target device. The transfer server AirOn has three profile descriptions Profile Description 1, 2, 3 stored there or otherwise available to the transfer server AirOn. Based on the parameter set received from the target eUICC/target device, the transfer server AirOn retrieves a suitable profile description, in FIG. 1 Profile Description 2. I required, the transfer server AirOn adapts the retrieved suitable profile description Profile Description 2. Further, the transfer server AirOn merges the profile description with profile data for the target eUICC and executed the thus generated combined profile description/profile data item. By this merger and execution process, the profile package is generated. Then, the profile package is encrypted by a key specific for the target eUICC. Finally, the encrypted profile package (2) is downloaded to the target eUICC via the target device.

Figure 1B:
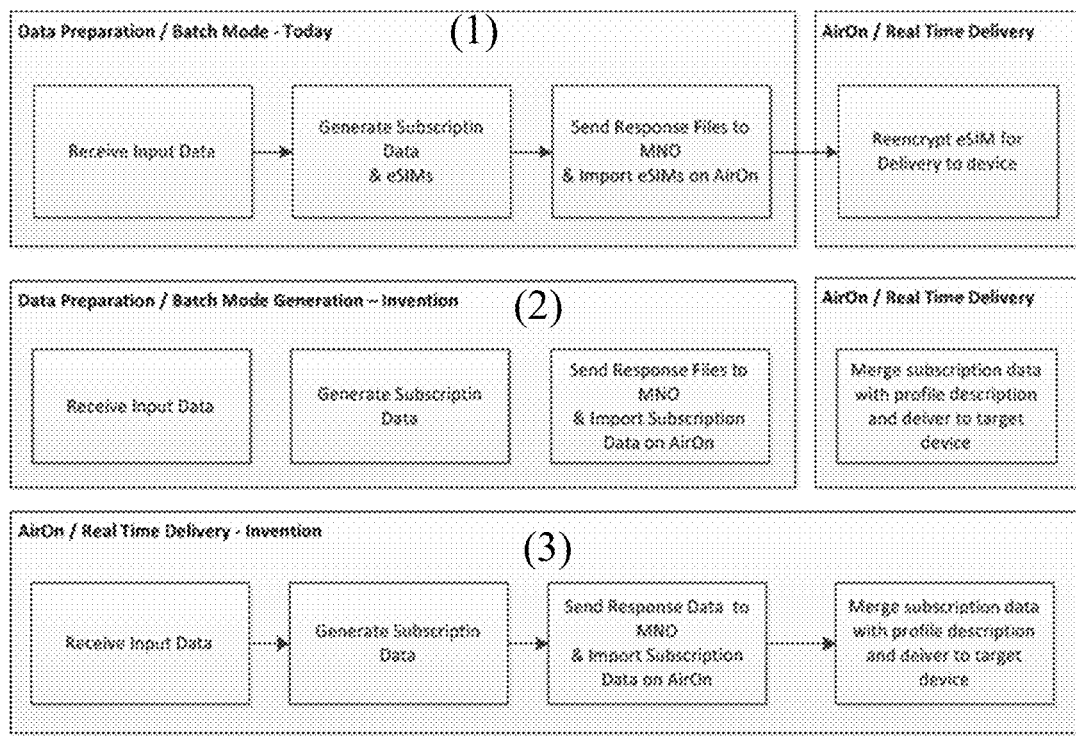
FIG. 1B: a comparison of known (today) static generation of profile packages to adaptive generation of a profile package, according to embodiments of the invention.

FIG. 1B shows a comparison of (1) known (today) static generation of profile packages to (2, 3) adaptive generation of a profile package, according to embodiments of the invention.

(1) Today, subscription profile packages are statically generated, so as to generate ready-made static profiles. By this method, a batch of multiple ready-made profiles is generated in advance to and independently of profile download requests. Upon request from a target eUICC, the transfer server preforms a real time delivery of one of the ready-made profile packages.

(2) According to the invention, in advance to and independently of profile download requests, profile descriptions and profile data (=subscription data) are provided separately. Only upon receipt of a profile download requests at the transfer server AirOn, the transfer server AirOn merges profile (subscription) data and profile description and generates the profile package and downloads it to the eUICC.

Figure 2:
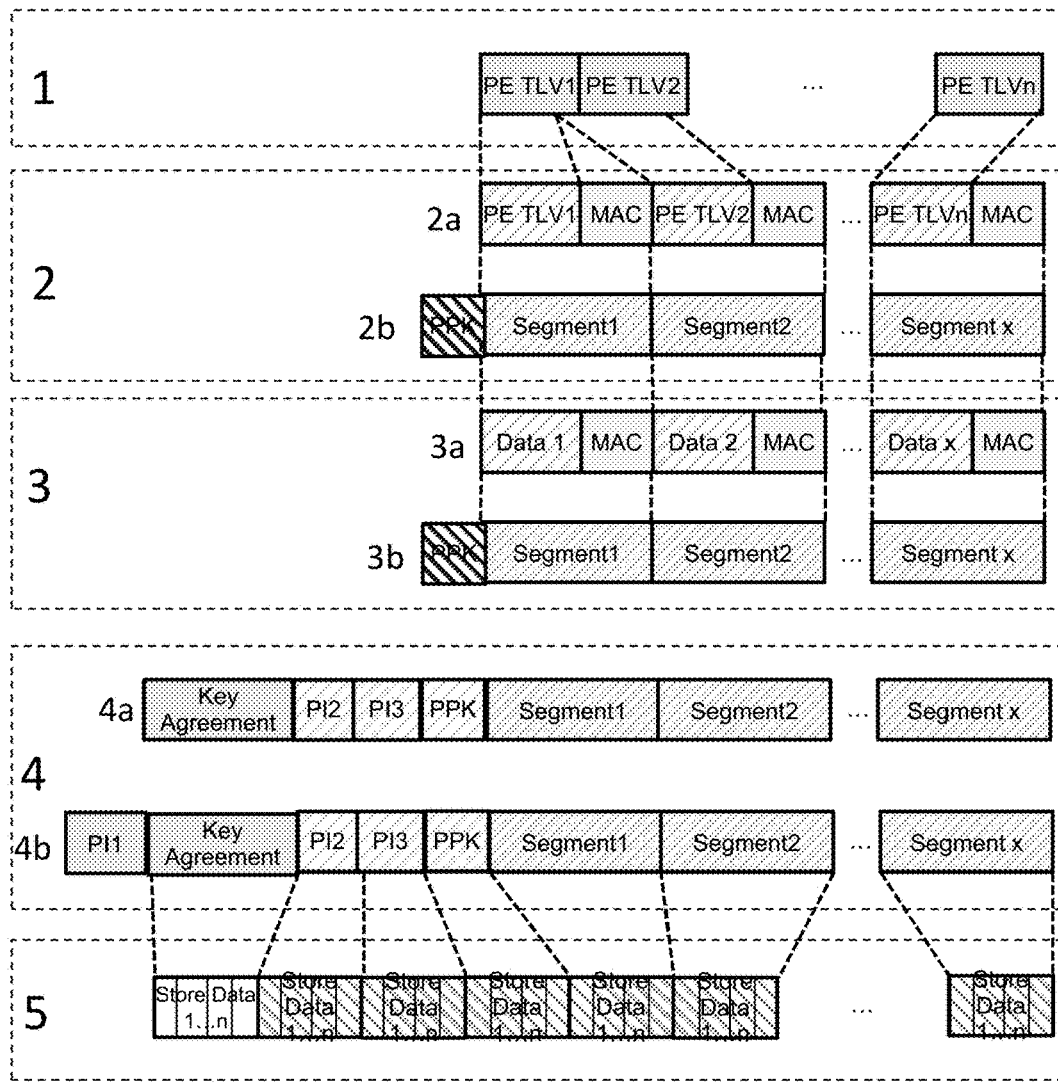
FIG. 2 a schematic diagram showing data fields of a profile package during the process of generation of the profile package, according to embodiments of the invention related to [2][SGP.22]

FIG. 2 shows a schematic diagram showing data fields of a profile package during the process of generation of the profile package, according to embodiments of the invention related to [2][SGP.22] (RSP). (In M2M use cases, the data fields have a partly different structure.) FIG. 2 shows five levels numbered by 1 to 5. Level 1 shows the format of data fields according to interoperable format according to [2] [SGP.22] (RSP) (particularly TLV=tag length value). Level 2 shows a static profile description with placeholders PE TLV, numbered 1, 2, . . . n, in data fields into which profile data will be inserted later. In addition, place holders for Message Authentication Codes MACs are inserted into the profile description. Level 3 shows the profile description of level 2, however after the placeholders PE TLV, numbered 1, 2, . . . n, in the data fields have been replaced by real profile data Data1, Data2, . . . Datax. Further, Message Authentication Codes MACs are calculated over the profile data Data1, Data2, . . . Datax and stored into the data fields of the profile description, so as to replace the MAC placeholders. After merger, the filled-in profile description plus profile is executed so as to generate the profile package. The profile package is then encrypted by an encryption key of a target eUICC. Further, the profile package is divided into segments, each segment having a suitable size for download to an eUICC. Later the segments will be downloaded to the target eUICC one after another, so as to load the profile package to the target eUICC.

Figure 3:
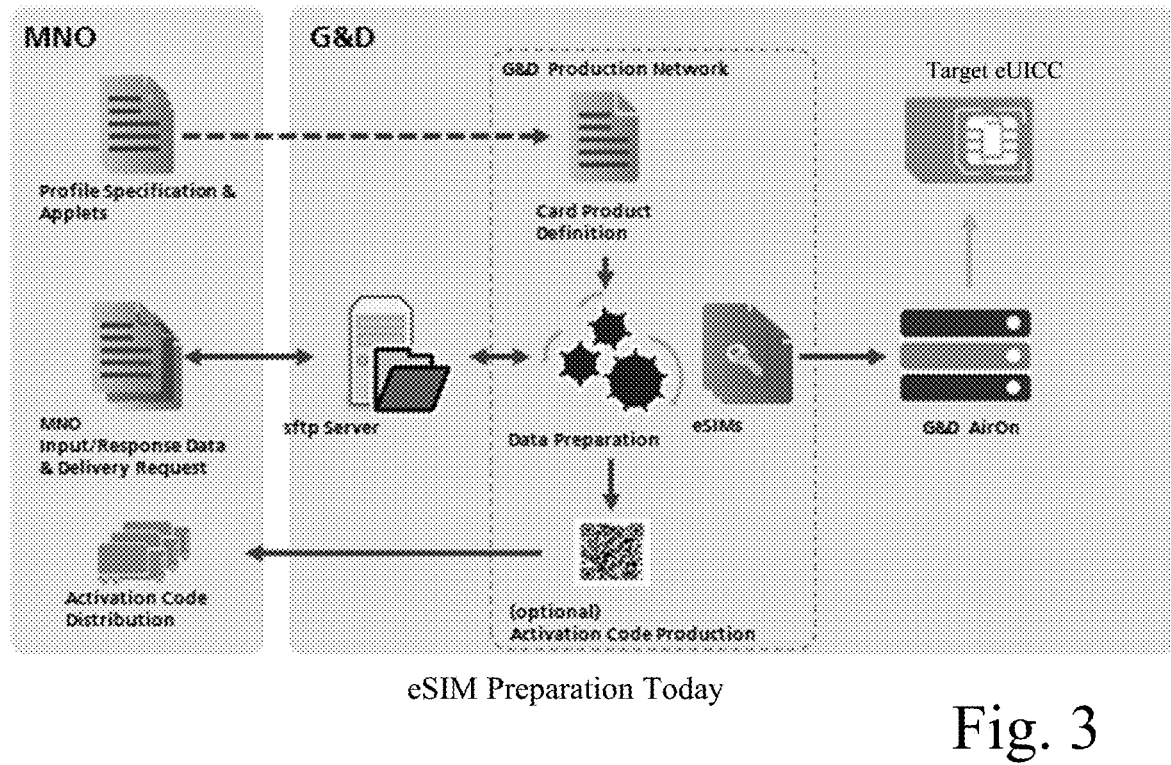
FIG. 3 a schematic diagram showing architecture of a known, today system for generation of profile packages.

FIG. 3 shows a schematic diagram showing architecture of a known, today system for generation of profile packages. Profile descriptions (=profile specifications) and profile data (not shown) are provided from a MNO server of a Mobile Network Operator MNO to the data preparation server of a profile package generation company, here "G&D". The data preparation server performs the process of data preparation on a profile description in combination with profile data, and thereby generates a profile package, here depicted as eSIM. The generated profile package/eSIM is forwarded from the data generation server to a transfer server AirOn and, from the transfer server AirOn, downloaded to a target eUICC.

Figure 4:
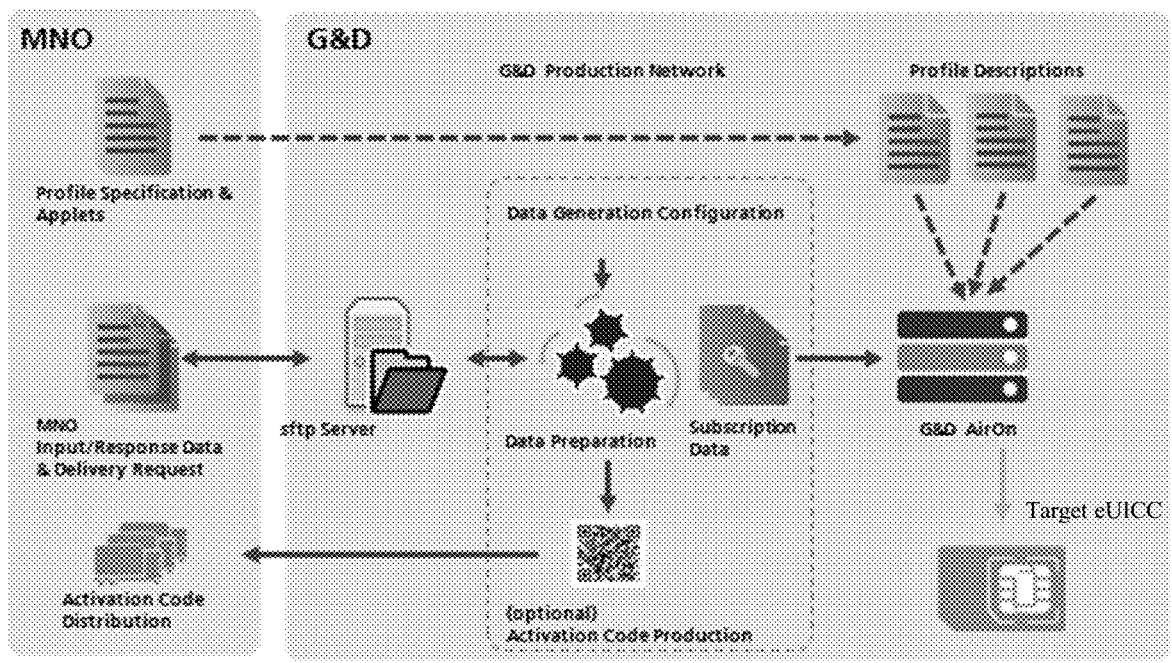
FIG. 4 a schematic diagram showing architecture of a system for generation of profile packages, according to embodiments of the invention.

FIG. 4 shows a schematic diagram showing architecture of a system for generation of profile packages, according to embodiments of the invention. The profile data is provided to the data preparation server as usually. In addition, the profile data are further forwarded to the transfer server AirOn. According to the invention, several profile descriptions are provided, here three are shown as an example. The several profile descriptions are forwarded from the MNO server, instead of to the transfer server, now directly to the transfer server AirOn. The transfer server receives configuration information on the target eUICC and/or on the target device hosting the target eUICC and selects and retrieves a matching profile description. With the selected and retrieved profile description and the profile data, the transfer server AirOn generates a profile package and downloads it to the target eUICC.

CITED DOCUMENTS

[1][SGP.02_v3.2] GSMA *"Remote Provisioning Architecture for Embedded UICC, Technical Specification"*, Version 3.2, 27 Jun. 2017
[2][SGP.22] GSMA *"RSP Technical Specification, Version 2.2, 1 Sep. 2017"*
[3][Profile Package] SIM Alliance *"eUICC Profile Package: Interoperable Technical Specification"*, Version 1.0, 25 Jun. 2015

What is claimed is:

1. A method of adaptive generation of a profile package, said profile package being constructed to, when being downloaded to an eUICC and installed in the eUICC, install a profile in the eUICC;
the method comprising the steps:
(1.1) receive multiple different profile descriptions from a Mobile Network Operator (MNO) server, each profile description being data specific to a use case of the profile, and provide the multiple different profile descriptions relating to different configurations of an eUICC and/or of a target device hosting the eUICC or constructed to host the eUICC;
(1.2) receive configuration information comprising one or more profile parameters on a target eUICC or/and on the target device hosting the eUICC or constructed to host the eUICC, wherein the configuration information is received from one or several of the following instances: the target eUICC, the target device, a data preparation server such as SM-DP+, SM-DP, or SM-SR, and the MNO server;
(1.3) retrieve, out of the multiple different profile descriptions, a profile description matching with respect to the received configuration information;
(2) at a data preparation server, provide profile data comprising subscription data that are prepared considering input from the MNO server, wherein the profile data are individual data to a particular profile or user;
(3) provide the profile description with the profile data and execute the profile description together with the profile data to generate a profile package being an entity of data ready for download to the eUICC corresponding to the profile data and the profile package;
wherein steps (1) and (3) are performed at a transfer server different from SM-DP+, SM-DP, and SM-SR configured to download profile packages to eUICCs,
wherein after step (2), at the transfer server: (2.1) receive the profile data from the data preparation server;
wherein in step (3), at the transfer server, merge, in reaction to a request from the eUICC to the transfer server to download a profile package to the eUICC, the retrieved matching profile description together with the profile data to generate the profile package, therein retrieving a matching profile description, so as to achieve adaptive generation of the profile package.

2. A method of adaptive generation of a code package, said code package being constructed to, when being downloaded to a device and installed in the device, install an executable code in the device;
the method comprising the steps:
(1.1) receive multiple different code descriptions from a Mobile Network Operator (MNO) server, each code description being data specific to a use case of the executable code, and
provide the multiple different code descriptions relating to different configurations of an eUICC and/or of a target device hosting the eUICC or constructed to host the eUICC;
(1.2) receive configuration information comprising one or more profile parameters on a target eUICC or/and on the target device hosting the eUICC or constructed to host the eUICC, wherein the configuration information is received from one or several of the following instances: the target eUICC, the target device, a data preparation server such as SM-DP+, SM-DP, or SM-SR, and the MNO server;
(1.3) retrieve, out of the multiple different code descriptions, a code description matching with respect to the received configuration information;
(2) at a data preparation server, provide code data comprising subscription data that are prepared considering the input from the MNO server, wherein the code data are individual data to a particular executable code;
(3) provide the code description with the code data and execute the code description together with the code data to generate a code package being an entity of data ready for download to the eUICC corresponding to the code data and the code package;

wherein steps (1) and (3) are performed at a transfer server different from SM-DP+, SM-DP, and SM-SR configured to download code packages to devices, wherein after step (2), at the transfer server: (2.1) receive the code data from the data preparation server;

wherein in step (3), at the transfer server, merge, in reaction to a request from the eUICC to the transfer server to download a code package to the eUICC the retrieved matching code description together with the code data to generate the code package, therein retrieving a matching code description, so as to achieve adaptive generation of the code package.

3. The method according to claim 2, wherein the executable code is an operating system and/or the code package is an image for installing an operating system in the device.

4. The method according to claim 1, wherein the configuration information received in step (1.2) consists of a particular parameter set comprising one or several parameters.

5. The method according to claim 4, wherein:
the parameters of the parameter set are identified as either mandatory or optional parameters;
the parameter set comprises at least mandatory parameters, and optionally in addition also optional parameters;
the profile description is retrieved based on the mandatory parameters; and
in case optional parameters are contained in the parameter set, the retrieved profile description is adapted based on the optional parameters.

6. The method according to claim 4, wherein the parameter set comprises one or several of the following parameters:
parameters characteristic of the target eUICC;
parameters characteristic of the target device.

7. The method according to claim 6, wherein the parameters comprise one or several of the following:
one or several parameters indicating eUICC capabilities of the target eUICC;
one or several parameters indicating device capabilities the target device;
one or several eUICC certificates of the target eUICC;
an eUICC identifier of the target eUICC;
an Integrated Circuit Card Identifier or comparable unique electronic serial number of the target eUICC;
an International Mobile Station Equipment Identity of the target device.

8. The method according to claim 1, wherein:
in step (1.1), the multiple different profile descriptions are provided with placeholders for later insertion of profile data or code data, respectively; and
in step (3), the retrieved profile description is provided with the profile data for the target eUICC in that the placeholders are replaced by the profile data.

9. The method according to claim 1, further comprising the step:
(4) At the transfer server, encrypting the generated profile package to the target eUICC by means of a secret, particularly a session key, established between the eUICC and the transfer server.

10. The method according to claim 1, wherein in step (2), additional profile data are provided,
wherein the additional profile data are not considered in step (3) to execute the retrieved matching profile description together with the profile data, such that the profile package is generated without the additional profile data.

* * * * *